US012730544B2

United States Patent
(12) United States Patent
Russell et al.

(10) Patent No.: US 12,730,544 B2
(45) **Date of Patent: *Sep. 8, 2026**

(54) DYNAMIC ACTIONABLE NOTIFICATIONS

(71) Applicants: Atlassian Pty Ltd., Sydney (AU); Atlassian US, Inc., San Francisco, CA (US)

(72) Inventors: Matthew Russell, Sydney (AU); Joshua Devenny, Sydney (AU); Christophe Paul Capel, Sydney (AU); Nathaniel Mackay Stuart Jones, Sydney (AU); Princey James, Sydney (AU); Mostafa A. Draz, Sydney (AU); Paul Murray Slade, Sydney (AU); Carl Pritchett, Sydney (AU); Fernanda Rockert Gomes, Sydney (AU); Eric James Fry, Sydney (AU); Xuting Qiu, Sydney (AU)

(73) Assignees: ATLASSIAN PTY LTD, Sydney (AU); ATLASSIAN US, INC., San Francisco, CA (US)

( * ) Notice: Subject to any disclaimer, the term of this patent is extended or adjusted under 35 U.S.C. 154(b) by 288 days.

This patent is subject to a terminal disclaimer.

(21) Appl. No.: 18/665,448

(22) Filed: May 15, 2024

(65) Prior Publication Data

US 2024/0302933 A1 Sep. 12, 2024

Related U.S. Application Data

(63) Continuation of application No. 17/362,827, filed on Jun. 29, 2021, now Pat. No. 11,989,384.

(Continued)

(51) Int. Cl.
*G06F 3/04812* (2022.01)
*G06F 3/04842* (2022.01)

(52) U.S. Cl.
CPC ...... *G06F 3/04812* (2013.01); *G06F 3/04842* (2013.01)

(58) Field of Classification Search
CPC ............................ G06F 8/315; G06F 11/3608
See application file for complete search history.

(56) References Cited

U.S. PATENT DOCUMENTS 5,867,281 A 2/1999 Nozoe et al.
6,691,153 B1 2/2004 Hanson et al.
(Continued)

OTHER PUBLICATIONS

Author Unknown, "API End point,"https://rapidapi.com/blog/api-glossary/endpoint/, 2022.

*Primary Examiner* — Seth A Silverman
(74) *Attorney, Agent, or Firm* — Brownstein Hyatt Farber Schreck, LLP

(57) ABSTRACT

Systems and methods for using dynamic actionable notifications are disclosed. The method includes: receiving, at a client device, a dynamic actionable notification associated with an event at a remote server, the dynamic actionable notification including one or more action items associated with the event; detecting user interaction with the dynamic actionable notification; retrieving current status of the one or more action items from the remote server; displaying one or more actionable graphical elements in a user interface of the dynamic actionable notification based on the retrieved current status of the one or more action items.

20 Claims, 7 Drawing Sheets

Related U.S. Application Data

(60) Provisional application No. 63/046,021, filed on Jun. 30, 2020, provisional application No. 63/045,651, filed on Jun. 29, 2020.

(56) References Cited

U.S. PATENT DOCUMENTS

| | | | |
|---|---|---|---|
| 7,222,156 | B2 | 5/2007 | Gupta et al. |
| 2009/0248806 | A1 | 10/2009 | Teman |
| 2013/0167020 | A1 | 6/2013 | Farmer et al. |
| 2013/0246538 | A1 | 9/2013 | Maimon et al. |
| 2014/0031117 | A1* | 1/2014 | Mello ..................... A63F 13/85 463/31 |
| 2017/0343360 | A1* | 11/2017 | Harikrishnan ......... G01C 21/28 |
| 2018/0054410 | A1 | 2/2018 | Bhagwan et al. |
| 2019/0042988 | A1* | 2/2019 | Brown ................ G06F 16/9535 |
| 2019/0073193 | A1* | 3/2019 | Krispin ................ G08B 25/012 |
| 2020/0234242 | A1 | 7/2020 | Parks et al. |

* cited by examiner

DISPLAY 212

INPUT DEVICE 214

CURSOR CONTROL 216

MAIN MEMORY 206

ROM 208

STORAGE DEVICE 210

BUS 202

PROCESSOR 204

COMMUNICATION INTERFACE 218

NETWORK LINK

220

Network 140

DYNAMIC ACTIONABLE NOTIFICATIONS

CROSS-REFERENCE TO RELATED APPLICATION(S)

This application is a continuation patent application of U.S. patent application Ser. No. 17/362,827, filed Jun. 29, 2021 and titled "Dynamic Actionable Notifications," which is a nonprovisional patent application of and claims the benefit of U.S. Provisional Patent Application No. 63/045,651, filed Jun. 29, 2020 and titled "Systems and Methods for Creating, Delivering and Using Dynamic Actionable Notifications," and U.S. Provisional Patent Application No. 63/046,021, filed Jun. 30, 2020 and titled "Systems and Methods for Creating, Delivering and Using Dynamic Actionable Notifications," the disclosures of which are hereby incorporated herein by reference in their entireties.

TECHNICAL FIELD

Aspects of the present disclosure are directed to managing notifications and in particular to systems and methods for creating and delivering dynamic notifications and allowing users to perform one or more actions via the dynamic notifications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Many computer applications these days offer notifications to users when certain events are detected in the application that may concern the user. For example, organization tools such as issue tracking systems (e.g., Jira®) or source code management systems (e.g., Bitbucket®) send notifications to users whenever any tasks/actions require the user's attention. Typically, these notifications are sent to users via different communication channels, such as emails, SMS, chat messages, WhatsApp message, etc.

However, in most cases, these notifications are static and relate to the state of an event at the particular point in time when the event was detected. The systems and techniques described herein are directed to the creation, delivery and/or use of electronic notifications that may not have some of the drawbacks of traditional systems.

SUMMARY

In certain embodiments of the present disclosure a computer-implemented is disclosed. The method includes receiving, at a client device, a dynamic actionable notification associated with an event at a remote server. The dynamic actionable notification includes one or more action items associated with the event. The method further includes detecting user interaction with the dynamic actionable notification, retrieving current status of the one or more action items from the remote server, and displaying one or more actionable graphical elements in a user interface of the dynamic actionable notification based on the current status of the one or more action items.

In other embodiments of the present disclosure a system is disclosed. the system includes a processor and non-transitory memory comprising instructions which when executed by the processor cause the system to: receive a dynamic actionable notification associated with an event at a remote server, the dynamic actionable notification including one or more action items associated with the event, detect user interaction with the dynamic actionable notification, retrieve current status of the one or more action items from the remote server, and display one or more actionable graphical elements in a user interface of the dynamic actionable notification based on the current status of the one or more action items.

In yet other embodiments of the present disclosure a non-transitory computer readable medium is disclosed. The non-transitory computer readable medium comprises instructions which when executed by a processor cause a computer system to: receive a dynamic actionable notification associated with an event at a remote server, the dynamic actionable notification including one or more action items associated with the event, detect user interaction with the dynamic actionable notification, retrieve current status of the one or more action items from the remote server, and display one or more actionable graphical elements in a user interface of the dynamic actionable notification based on the current status of the one or more action items.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
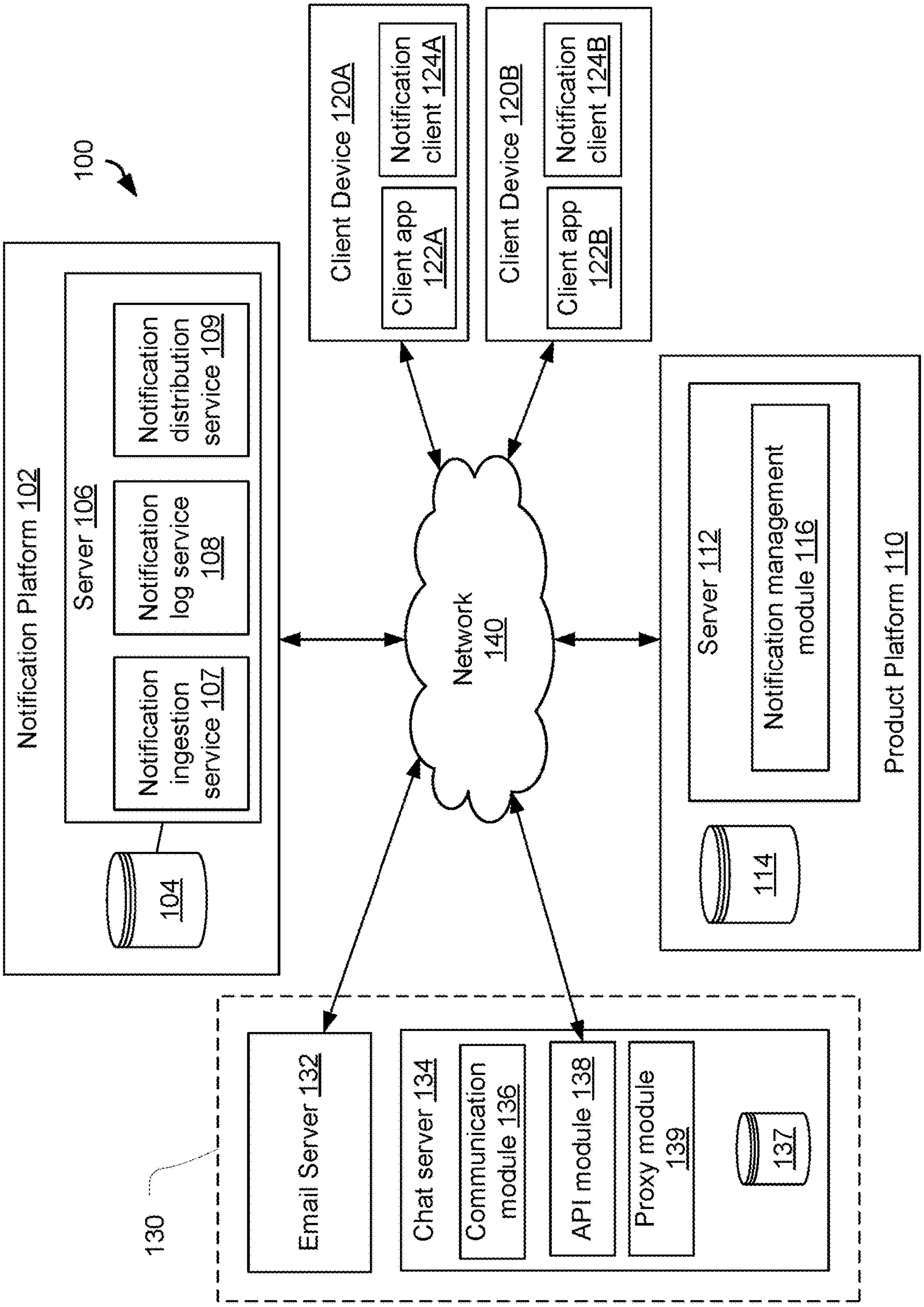
FIG. 1 is a block diagram of a networked environment according to some embodiments of the present disclosure.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described previously, conventional electronics notifications are static and relate to the state of an event at the particular point in time when the event was detected. If the event that caused the notification to be created and sent to the user has subsequently been changed by another user, the notification does not reflect this. For example, a notification may be created by an issue tracking system when a new ticket is generated and sent to a first user's email account to inform the first user about the new ticket awaiting assignment to a particular support engineer. If a second user subsequently visits the issue tracking system application on his/her own accord (without checking his/her email) and assigns the ticket to a particular support engineer, the notification sent to the first user's account typically does not get updated. Instead, when the first user eventually visits their email account and views the email notification, the first user is notified of the new ticket (which has already been assigned by the second user). As the first user is unaware that the ticket has already been assigned, the user may log into the issue tracking system application to discover that the task has been completed, thereby wasting valuable time.

Further, notifications typically include a link to direct the user back to the corresponding application to perform an associated action, e.g., assign a ticket to a support engineer, review/approve a source code change, etc. If a user receives a couple of notifications a day, a user may be able to proceed to the application to review the item, and/or perform an associated action. However, if a user is inundated by such notifications from multiple applications every day, and each time the user has to navigate to the associated application to view the item and perform the action, the user wastes valuable time and network bandwidth.

Embodiments of the present disclosure are related to dynamic notifications—i.e., notifications that inform the user of the current state of a corresponding event (that occurred at the computer application) at the time the user engages with the notification and not the state of the corresponding event at the time the notification was created. For example, embodiments of the present disclosure can generate and deliver a dynamic notification when an event occurs at a computer application to a client device. Subsequently, when the user engages with the notification, the computer application can retrieve the latest state associated with the event and forward this information to the client device for rendering on a display of the client device. In this manner, when a user views a notification the user is informed of the latest state associated with the event and not a past state of the event. This is especially useful in cases where the state of an event changes frequently or multiple times after the event is detected and/or where an event is associated with multiple stakeholders/users—e.g., in the case of issues and tickets in an issue tracking system, in the case of reviewing and approving updates to source code in a source code management system, and/or in cases where one or more user comments are received in relation to an item in a content management system.

Further, the dynamic notification of the present disclosure includes one or more action items that allow users to perform one or more actions on the event associated with the dynamic notification directly via the notification without the need to be redirected to the corresponding computer application. For example, a source code management system may be configured to generate dynamic notifications that allow a user to approve a pull request directly from the notification without the need to redirect to the source code management system. To this end, the notification may include the information necessary for the user to make an informed decision. Further, once the action is performed, the dynamic notification may inform the user that the action has been successfully completed, thereby, again, circumventing the need to visit the source code management system application to determine whether the action has been completed. Other examples of actions include assigning an issue, resolving an issue, running/rerunning a source code build, etc.

In some embodiments, the dynamic actionable notifications are generated by organizational product applications that are used by teams of user to collectively work on software development, projects, issues, incidents, etc. In such cases, typically more than one user may be able to action an event. For example, in the case of a source code management system, any member of the team may approve a build in the testing stage, senior engineers may be permitted to approve builds in the staging environment and team leads may be permitted to approve builds in the production environment. In such cases, the users that are permitted to approve a build may be sent a notification. But even if one person approves the build, the action can be completed. In such cases, the other users that have received the notification requesting approval may unnecessarily have to decide whether to approve the build or not when that action is already taken. Accordingly, in such type of team environments, it is important to update the actionable items in a notification when a user engages with the notification. This way, if a corresponding action has already been taken by another user, the notification can be updated to reflect that action has already been completed and the user does not need to do anything further.

In one example, a dynamic actionable notification may be used to allow users in a team to comment on an event or comment on as a reply to another comment made by a team member directly from the dynamic notification and/or view latest comments on the event directly from the dynamic notification. In another example, a user may be allowed to perform an action directly from the notification (e.g., assigning a ticket to another team member or approve a source code build/deployment).

In some cases, events are time bound. For example, in issue tracking systems, once a new task ticket is received at the issue tracking system, the team may be allocated a particular time period (typically governed by a service-level agreement between the service provider and clients) in which the new task ticket has to be assigned and completed. In such cases, the dynamic notification may include a timer/countdown affordance that displays the amount of time remaining to complete the task and/or the amount of time elapsed since the task was first created/received at the issue tracking system.

In order to perform these operations/functions, the dynamic notification includes, e.g., instructions to allow the client device to securely contact the computer application to receive the latest status of the event in the dynamic notification. The dynamic notification may also include information about the type of content the client device needs to request from the computer application, and/or information about how to render the retrieved content. Further, the dynamic notification includes information about the type of actionable graphical elements to render in the dynamic notification and information about how to push any actions performed by the user back to the product platform.

These and other aspects of the present disclosure will be described in detail with reference to FIGS. 1-8 below.

Environment Overview

FIG. 1 illustrates an environment 100 in which one or more aspects of the present disclosure are implemented. Specifically, FIG. 1 illustrates the systems involved in generating, delivering, viewing and/or actioning dynamic notifications as described herein. In this example embodiment, the systems include a notification platform 102, a product platform 110, communication servers 130, and client devices (e.g., client devices 120A, 120B, and 102C, collectively referred to as client devices 120). The notification platform 102, product platform 110, communication servers 130, and client devices 120 communicate with each other over one or more communication networks 140.

In general, the product platform 110 is a system entity that hosts one or more software applications and/or content. The product platform 110 may include one or more servers 112 for hosting corresponding software application(s) and one or more databases 114 for storing application specific data. Examples of software applications hosted by the product platform 110 include collaborative applications (e.g., Confluence), software code management applications (e.g., Bitbucket), and issue tracking applications (e.g., Jira). Jira, Confluence, and BitBucket are offered by Atlassian, Inc. It will be appreciated that the software applications need not be offered by the same organization and that the presently disclosed embodiments can be used with any product platform configured to interact with the notification platform 102.

In order to run a particular application, the server 112 includes one or more application programs, libraries, APIs, or other software elements that implement the features and functions of the application. In one example the server 112 includes a notification management module 116 which detects events, generates notification requests, receives and responds to requests for latest status of events, receives and actions any action requests received from client devices 120, and communicates status of actions once the product platform 110 is updated. Functions of the notification management module 116 will be described in detail with respect to FIGS. 2-8 disclosed herein.

The product platform 110 also stores product data. Product data generally includes: data defining the operation of the hosted application (for example, user accounts, user permissions, and the like); and application data (i.e., the content hosted/maintained by the application, which can be, for example, issue data (in Jira), page/document data (in Confluence), source code data (in BitBucket), etc.). The data is stored on and managed by database 114. Database 114 is provided by a database server which may be hosted by server 112, but is more typically hosted on a separate physical computer in communication (directly or indirectly via one or more networks) with the server 112.

While single server architecture has been described herein, it will be appreciated that the product platform 110 can be implemented using alternative architectures. For example, in certain cases a clustered architecture may be used where multiple server computing instances (or nodes) are instantiated to meet system demand. Conversely, in the case of small enterprises with relatively simple requirements a product platform 110 may be a stand-alone implementation (i.e., a single computer directly accessed/used by the end user).

The notification platform 102 is configured to receive dynamic notification requests from the product platform 110, generate dynamic actionable notifications from these requests, and forward the generated dynamic actionable notifications to one or more communication servers 130 for forwarding to the intended recipient client devices 120 of these dynamic actionable notifications.

In order to perform these functions, the notification platform 102 includes a server 106 and a database 104. The server 106 may be configured to communicate with the product platforms 110, and the communication servers 130 to service notifications. Further, the server 106 may include services that work together to generate and serve dynamic notifications from the product platform 110 to the client devices 120. In one example, the services provided by the server 106 may include a notification ingestion service 107, a notification log service 108 and a notification distribution service 109. The notification ingestion service is configured to receive dynamic notification requests from product platforms 110, validate the requests, upload any rich text content in the notification from the product platform 110 and send the validated notifications to the notification log service 108. The notification log service is configured to generate notification messages based on the requests, store the generated notification messages, handle batching of notifications, and transform and send notifications to the notification distribution service 109. The notification distribution service 109 in turn is configured to render stream notifications for sending via the communication servers 130 to the client devices 120.

The database 104 is configured to store notification data (which includes e.g., notification content, sender and recipient details, product platform endpoint for retrieving latest status associated with the notification, etc.). In addition, the product platform 110 may register different types of notifications with the notification platform 102 by way of registration documents. The database 104 stores these registrations documents. In addition, the database 104 also stores templates for different types of notifications.

The communication servers 130 may include an email server 132 and a chat server 134. The email server 132 communicably couples with the notification platform 102 to receive email messages with dynamic notifications intended for a subscriber of the email server 132. At a later time, a client device 120 operated by the intended recipient communicably couples to the email server 132 and receives a copy of the email message (including the dynamic notification) sent from the notification platform 102.

More specifically, in many implementations, the email server 132 is communicably coupled to the notification platform 102 via one or more email message sending communication protocols, such as the Simple Mail Transfer Protocol ("SMTP"). Similarly, the email server 1xx is communicably coupled to the client devices 120 via one or more email message receipt communication protocols, such as the Internet Message Access Protocol ("IMAP"), the Post Office Protocol (e.g., "POP3"), or other protocols, such as Microsoft's Exchange/ActiveSync protocol.

As a result of this architecture, the notification platform 102 can generate an email message that includes a dynamic notification, such as described herein, and can communicate the email message to the email server 132 which may store the email message in a database. Thereafter, the client device 120 can submit a request to the email server 132 to receive a copy of the email message, served from one of the databases of the email server 132.

The chat server 134 may be configured to receive dynamic notifications from the notification platform 102, communicate these as a chat message to one or more active chat interfaces displayed on client devices 120 and receive one or more action requests from the client devices 120 and forward these to the product platform 110 for actioning. In addition, the chat server 134 allows users to send messages to each other, join/create groups, transfer files, participate in audio/video calls, and the like through a corresponding client application running on the client device 120. To perform these functions, the chat server 134 includes a communication module 136 and an application programming interface (API) module 138. Where the client device 120 is a mobile computing device, the chat server 134 also includes a proxy module 139. In addition to these servers, the chat server 134 may also include application programs, libraries, APIs or other software elements that implement the features and functions that are further described herein. For instance, the chat server 134 may include a database 137 for storing information about different chat rooms created by users, clients connected to the chat server 134, user IDs, and so on.

The communication module 136 is configured to offer services required for real time communications, such as message handling and routing, presence detection, security and authorization. When the communication module 136 handles messages between different client devices 120, it uses an instant messaging protocol, such as Extensible Messaging and Presence Protocol (XMPP). It will be appreciated that any other instant messaging protocol such as Zephyr Notification Service, TOX, or Session Initiation Protocol (SIP) may be used instead without departing from the scope of the present disclosure.

The proxy module 139 is configured to maintain dedicated connections with active client devices 120. 'Active clients' as used herein, refers to clients that are involved in a chat session with one or more users and have at least one open chat interface. In one embodiment, the proxy module 139 may utilize bidirectional-streams over synchronous HTTP (BOSH) transport protocol for communicating with the communication module 136 and the client devices 120. The proxy module 139 is also configured to forward the connection information to the communication module 136, which in turn maintains a connections data structure (e.g., in the form of a connections table) in the database 137. The connections table stores the persistent connections of the active clients.

The API module 138 is configured to provide an interface between the client devices 120 and the chat server 134 and between the notification platform 102 and the chat server 134. Specifically, the API module 138 allows the clients and notification platform 102 to communicate with the chat server 134 over open web protocols such as (HTTPS, REST, and JWT). In some aspects the API module 138 receives dynamic notifications from the notification platform 102 and forwards these to the communication module 136. It also receives action requests from the communication module 136 and sends these action requests to the notification platform 102. In one embodiment, the API module 138 is based on the Representational State Transfer (REST) architectural style. Alternatively, it may be based on the Simple Object Access Protocol (SOAP) architecture.

Client devices 120 may be any device suitable for performing client-side operations described herein, for example a mobile device (e.g. a tablet or mobile phone), a portable device (such as laptop computer), or any other computing device (e.g. a desktop computer).

Generally speaking, users of client devices 120 are associated with one or more user accounts and generate and/or interact with electronic content hosted on the product platforms 110. This activity includes any type of user account interaction with the product platforms 110, including interaction with content and/or software applications hosted by the product platforms 110. Example interactions include accessing/viewing and/or contributing to one or more documents hosted by the product platforms, writing posts, commenting on content, visiting web pages, sharing, liking, or viewing content, reviewing/editing source code, approving pull requests, communicating with user accounts in real-time chat interfaces, etc.

In order to allow users to perform these functions, as illustrated in FIG. 1, each client device 120 includes one or more client (software) applications (e.g., client applications 122A and 122B) that are configured to access software applications made available by product platforms 110. In some cases, the client devices 120 may include a client application corresponding to each product platform 110 the client device 120 has access to. In other cases, a single client application (e.g., a web browser) may be utilized to communicate with multiple product platforms.

The client applications 122 include instructions and data stored in the memory (e.g. non-transitory computer readable media or medium) of the client devices 120 on which the applications are installed/run. These instructions are executed by a processor of the client device 120 to perform various functions as described herein. By way of example, some functions performed by the client applications 122 include communicating with applications hosted by the product platforms 110, rendering user interfaces based on instructions received from those applications, and receiving inputs from users to interact with content hosted by product platforms 110.

In addition to client applications 122 that allow users to interact with product platforms 110, the client devices 120 further include a notification client 124 configured to communicate with one or more of the communication servers to receive dynamic actionable notifications of the present disclosure. In addition, the notification client 124 may be configured to directly communicate with the product platform 110 and in particular the notification management module 116 to retrieve the latest status of events associated with the notifications and/or communicate any actions performed in the notifications to the product platform 110. In one example, the notification client 124 may be an email client. In another example, the notification client 124 may be a chat client.

In case the notification client 124 is an email client, it may be configured to communicably couple to, and exchange information with, the email server 132. In this example, the email client 124 can receive and/or otherwise process email notifications stored on the email server 132. Once a "new" notification is received by the email client 124 from the email server 132, it may be referred to as the "received email notification."

Once the email client 124 of the client device 120 receives the email notification from the email server 132, one or more processing services, functions, modules, or modes of operation of the email client 124 can be triggered. One or more of these processes can be configured to determine whether the received email message is a dynamic actionable notification or a simple static email/notification. In some embodiments, the notification client 124 may be configured to differentiate between static emails and dynamic actionable notifications based on a tag or identifier associated with the received email message. Dynamic notifications may have a tag or identifier that is distinguishable over tags or identifiers used for static emails.

For dynamic actionable notifications, the notification client 124 may be configured to retrieve the latest state of the action items in the notification directly from the product platform 110 and render graphical elements for the currently available action items on a display of the client device 120 when a user selects the dynamic actionable notification.

In case the notification client 124 is a chat client, it may be configured to communicably couple to, and exchange information, with a chat server 134.

The client applications 122 and 124 may be implemented in various ways. For example, the client applications may be web browser applications (such as, for example, Chrome, Safari, Internet Explorer, Opera) which access the applications hosted by the product platform 110 and/or the notification platform 102 via appropriate uniform resource locators (URL) and communicates with these systems via general world-wide-web protocols (e.g. HTTP, HTTPS, FTP). In this case, the web browser application is configured to request, render, and display user interfaces that conform to a markup language such as HTML, XML or extensions, and may be capable of internally executing browser-executable code such as JAVASCRIPT, or other forms of code. Alternatively, the client applications may be specific applications programmed to communicate with the product platform 110 and/or notification platform 102 using defined application programming interface (API) calls.

As illustrated in FIG. 1, communications between the notification platform 102, communication servers 130, client devices 120, and product platform 110 are via the communication network 140. The communication network 140 is depicted as a single network in FIG. 1 for case of depiction. However, in actual implementation, the various systems illustrated in FIG. 1 may communicate with each other over different communication networks. For example, the notification platform 102 may communicate with the product platform 110 through a local area network (LAN), whereas it may communicate with the communication servers 130 via a public network (e.g., the Internet). Similarly, the product platform 110 may communicate with one or more client devices 120 via a LAN and with other client devices 120 via a public network without departing from the scope of the present disclosure. Furthermore, the notification platform 102 and product platform 110 may communicate with each other over open web protocols such as (HTTPS, REST, and JWT).

It will be appreciated that although two client devices (120A and 120B), two communication servers 130, and one product platform 110 have been depicted, in normal operation, many more client devices 120, communication servers 130, and product platforms 110 may be interconnected through the network 140.

Further, although the notification platform 102 is depicted as independent of the product platform 110 in FIG. 1. This need not be the case in all implementations. Instead, in some implementations, the notification platform 102 may be a part of and controlled by the product platform 110.

Hardware Overview

The operations/techniques described herein are implemented by one or more special-purpose computing systems or devices. For example, in environment 100: the notification platform 102 may be provided by one or more computer systems; the product platform 110 may be provided by one or more computer systems; and each client device 120 is a computer system.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 2:
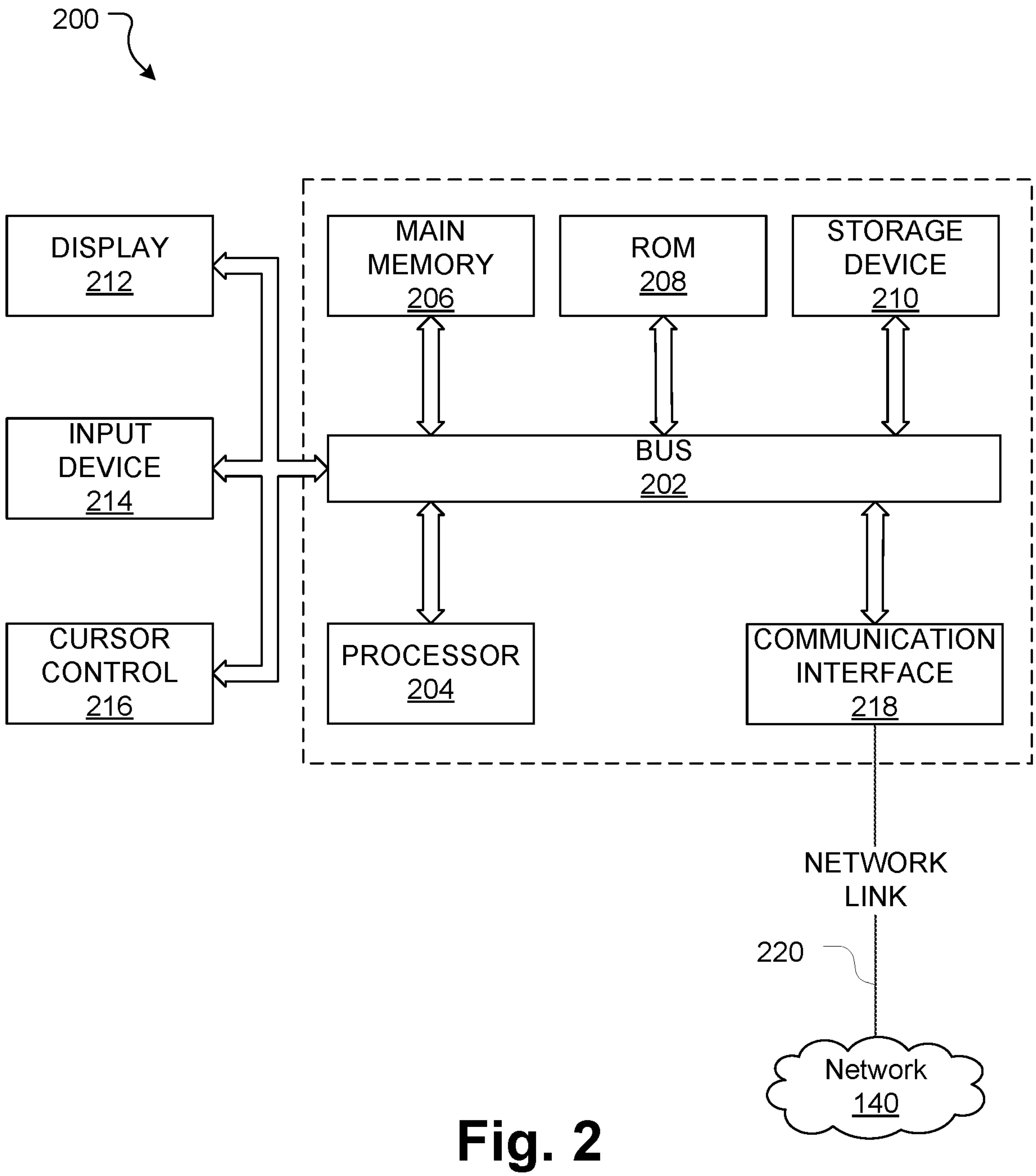
FIG. 2 is a block diagram of a computing system with which various embodiments of the present disclosure may be implemented.

For example, FIG. 2 is a block diagram that illustrates a computer system 200 upon which an embodiment of the present disclosure may be implemented. Computer system 200 includes a bus 202 or other communication mechanism for communicating information, and a processor 204 coupled with bus 202 for processing information. Processor 204 may be, for example, a general-purpose microprocessor.

Computer system 200 also includes a main memory 206 (also referred to as non-transitory computer readable media or medium), such as a random access memory (RAM) or other dynamic storage device, coupled to bus 202 for storing information and instructions to be executed by processor 204. Main memory 206 may also be used for storing temporary variables or other intermediate information during execution of instructions to be executed by processor 204. Such instructions, when stored in non-transitory (computer readable) storage media accessible to processor 204, render computer system 200 into a special-purpose machine that is customized to perform the operations specified in the instructions.

Figure 3:
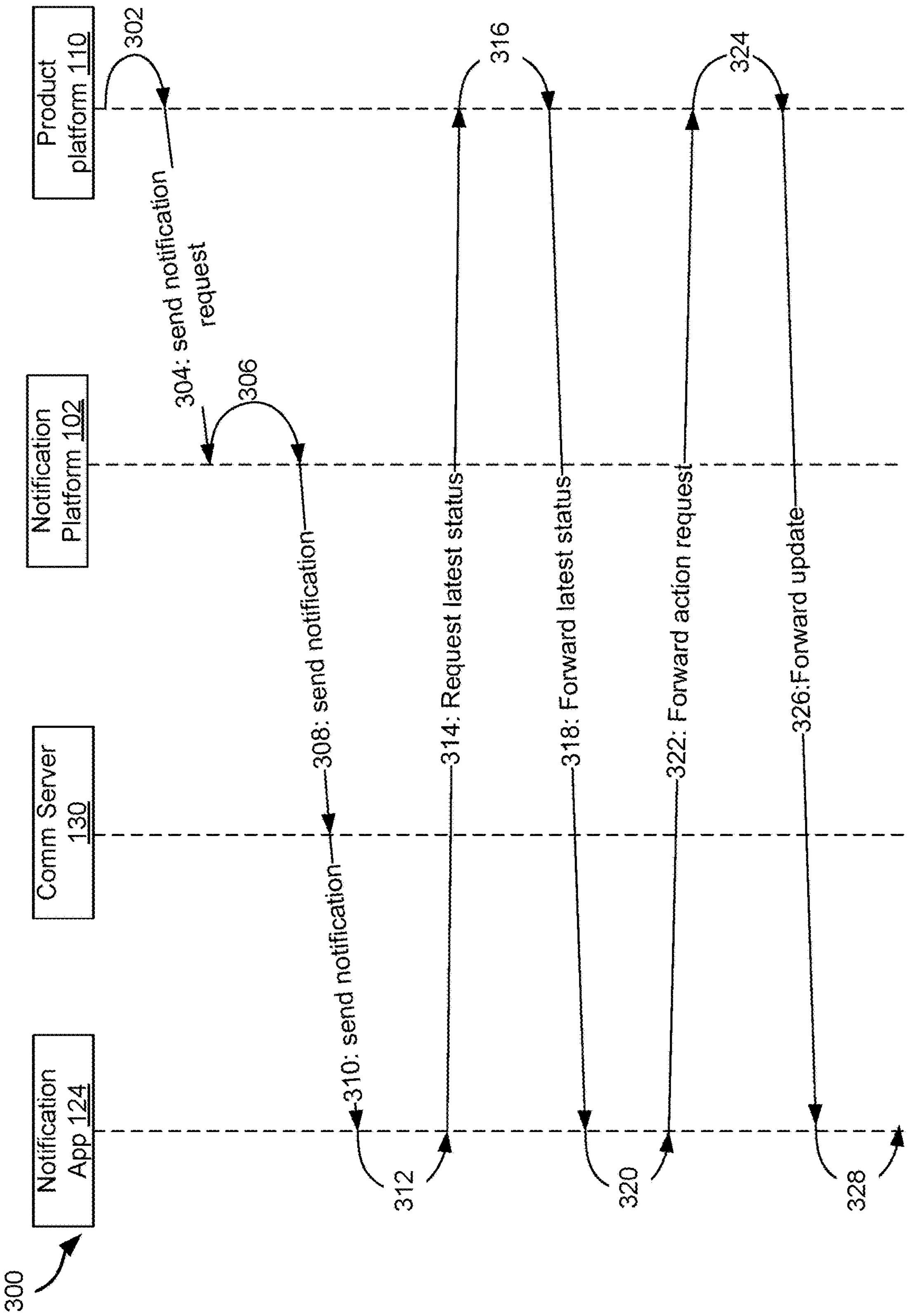
FIG. 3 is a message passing diagram illustrating a method for generating and using a dynamic notification according to some embodiments of the present disclosure.
Figure 4:
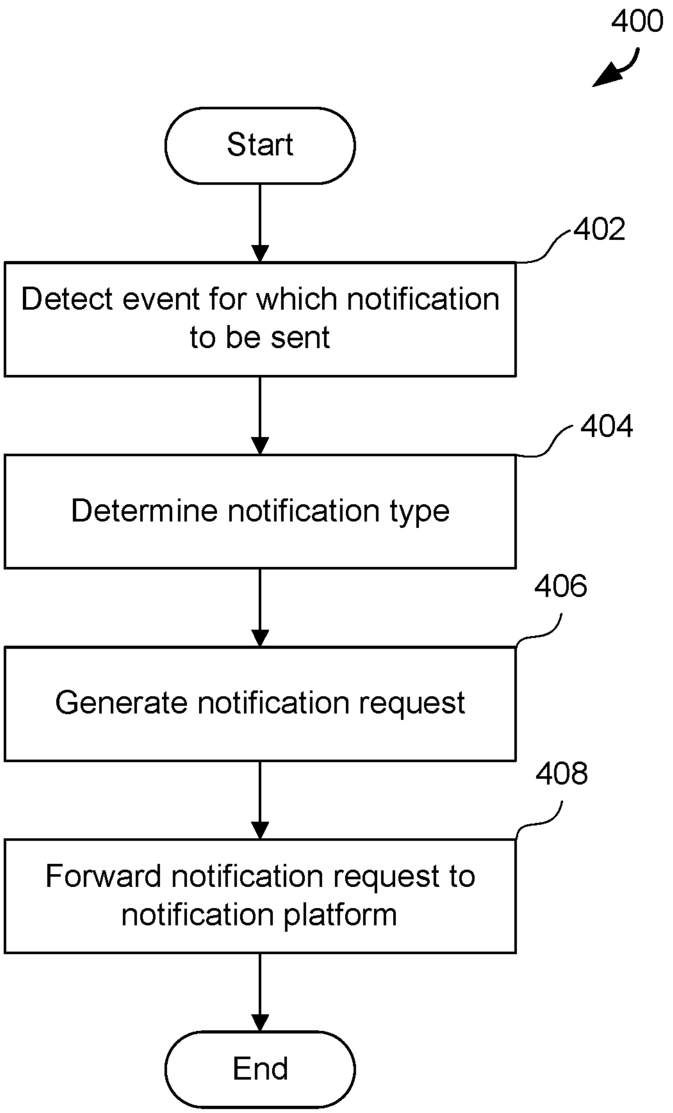
FIG. 4 is a flowchart illustrating a method for generating a notification request at a product platform according to some embodiments of the present disclosure.

Computer system 200 further includes other types of non-transitory computer readable media including read only memory (ROM) 208, a storage device 210, or other static storage device coupled to bus 202 for storing static information and instructions for processor 204. As shown in FIG. 3, a storage device 210, such as a magnetic disk or optical disk, is provided and coupled to bus 202 for storing information and instructions. If the computer system 200 is part of the notification platform 102, the storage device 210 may store database 104.

In case the computer system 200 is the client device 120, it may be coupled via bus 202 to one more output devices such as a display 212 for displaying information to a computer user. Display 212 may, for example, be a cathode ray tube (CRT), a liquid crystal display (LCD), a light emitting diode (LED display), or a touch screen display. An input device 214, including alphanumeric and other keys, may be coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that permits the device to specify positions in a plane. Additional and/or alternative input devices are possible, for example, touch screen displays.

According to one embodiment, the methods disclosed herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio wave and infrared data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector can receive the data carried in the infrared signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to network 140. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic, or optical signals that carry digital data streams representing various types of information.

Network link 220 typically provides data communication through one or more networks 140 to other computing systems. For example, if the computing system 200 is part of the notification platform 102, the network link 220 may provide a connection through network 140 to client devices 120 or product platform 110.

Computer system 200 can send messages and receive data, including program code, through the network(s), network link 220, and communication interface 218. In the notification platform example, the server 106 may receive notification requests from the product platform 110 through the network 140 and communication interface 218.

The processor 204 of the server 106 may execute the received notification request as it is received, and/or store it in storage device 210, or other non-volatile storage for later execution.

Exemplary Methods

This section describes various methods and processes for creating, delivering and using dynamic actionable notifications. Generally speaking, the dynamic actionable notification creation, delivery, and use processes can be split into a number of smaller processes-a process for creating a dynamic notification request, a process for delivering a dynamic actionable notification and a process for interacting with the dynamic actionable notification. For descriptive purposes, a high level process is described that includes all three of these processes and then each of these processes is described independently. However, in some embodiments, there may be substantial delay between processes—e.g., between the notification delivery and notification interaction processes. Further, in the remainder of the disclosure, the terms "dynamic actionable notification" and "dynamic notification" may be interchangeably used.

High Level Process

FIG. 3 is a swim-lane/message passing diagram illustrating an exemplary method 300 for creating, delivering and interacting with a dynamic actionable notification. Although method 300 is described with reference to a single notification, it will be appreciated that in practice this method is repeated for other notifications. The method describes steps performed by the product platform 110, the notification platform 102, the communication server 130, and the client device 120. It also describes communication steps between these entities. Further, in this method, it is assumed that the dynamic actionable notification includes one or more actionable items, which a user can select to perform one or more actions directly from the dynamic notification.

The method 300 begins at step 302, where the product platform 110 detects an event for which a dynamic actionable notification needs to be generated.

At step 304, the product platform 110 generates a notification request and forwards this to the notification platform 102. The notification request includes a list of intended recipients for the notification.

Next, at step 306, the notification platform 102 generates a dynamic actionable notification based on the notification request.

Once the dynamic actionable notification is generated it is communicated to one or more selected communication servers 130 at step 308 along with the identifiers of the intended recipients. The one or more communication servers 130 communicate the dynamic actionable notification to the client devices 120 of the recipients for rendering on the client device 120 at step 310.

At step 312, which may occur after some time, the client device (and in particular the notification client 124) detects the user interacting with the dynamic actionable notification. In case of an email client, the notification client 124 makes this determination when the user selects the email for display, e.g., from their inbox. In the case of a chat client, the notification client 124 makes this determination when, e.g., user opens a channel/room where the notification message is sent and the portion of the message stream where the dynamic notification is rendered is currently on display on the client device.

Upon determining that the user wishes to engage with the content of the dynamic actionable notification, the notification client 124 is configured to retrieve the current status of the action items associated with the dynamic actionable notification from the product platform 110. To this end, the notification client 124 may send a latest status request for the action items to the product platform 110 (at step 314). The product platform 110 in response to the query can look-up the current status of the action items (at step 316) and forward this back to the notification client 124 (at step 318). The client 124 then renders one or more actionable graphical elements based on the latest state of the action items as part of the dynamic notification. In some embodiments, if the allowed action(s) for the event have already been taken, the client 124 may not render any actionable graphical elements. Instead, it may update the notification to indicate that no action is currently required.

By retrieving and rendering actionable graphical elements based on the current status of the action items, the user can view the current context for the notification and make any decisions the user wishes to make based on this current information thereby avoiding taking any duplicative actions or any actions that contradict previously completed actions.

Once the notification message is displayed on the display of the client device 120, the notification client 124 determines whether the user has selected any of the displayed actionable graphical elements of the notification message at step 320. If a determination is made that the user has selected an actionable graphical element, the notification client 124 communicates the selected action to the product platform 110 at step 322. The product platform 110 in turn performs the corresponding action on the event corresponding to the notification at step 324 and forwards a confirmation message back to the notification client 124 at step 326. The notification client 124 then updates the dynamic notification to indicate that the action has been completed.

This way, a user can perform actions on notifications directly from the notification without having to load the product application.

The following sections describe this process in detail from the perspective of individual systems—i.e., the product platform 110, the notification platform 102, and the notification client 124.

Process at the Product Platform

As described previously, the product platform 110 and in particular the notification management module 116 is configured to detect events, send notification requests, communicate latest status of actions to client devices 120 upon receiving requests and update the status of events in response to receiving requests for actions performed at client devices 120.

In addition to this, before method 300 commences, the notification management module 116 is also configured to register the product platform 110 with the notification platform 102 in order to be able to send dynamic actionable notifications to intended recipients on its behalf. This registration may include, for example, providing a template for dynamic actionable notifications to the notification platform 102. The template basically provides a data format for notifications and the information that is to be included as part of the notification. In some cases, the product platform 110 can provide different templates for different types of dynamic actionable notifications. For example, one template may be used to request a user to assign a Jira ticket to a member of the user' team and another template may be used to request the user to approve a pull request in the source code management system. Similarly, different templates may be used for different communication channels. For example, a shorter template may be utilized or chat/mobile channels but a longer template may be utilized for email channels. In some embodiments, the notification platform 102 may offer a number of preconfigured templates for sending dynamic actionable notifications and the product platform 110 may select one or more of these for certain types of events.

The notification management module 116 also registers one or more notification types with the notification platform 102 at this stage. A notification type represents a notification and is described by settings and metadata. Registering a notification type enables the notification platform 102 to know parameters about notifications the notification management module 116 intends to send including, which product platform is generating the notification, which channels (e.g., email, mobile, chat) that notification platform should send the notification to, what data is to be included as part of the notification request, does the product platform have permission to send this type of notification, etc. Accordingly, a particular notification type registered with the notification platform 102 can include the following fields:

- Type identifier—this is used to identify the particular notification type/category and can be a name or a unique numeric identifier.
- Template Identifier—this is used to identify the particular template selected for this notification type. Depending on the template selected, future notification requests will have different payload requirements.
- Product platform identifier—to identify the product platform that will submit subsequent notification requests. This identifier may also be used to render product specific logos or footers in the rendered notifications.
- Channel(s)—a list of channels which the dynamic notification is enabled for. This may include, e.g., email, chat, mobile, etc.
- Issuer identifier—this is an identifier of the issuer that can sent notifications for this particular notification type. This information is used to ensure that the entity sending notification requests is allowed to send the notification requests on behalf of the product platform and to ensure that the entity is allowed to send notification requests for this type of notifications.
- Environment identifier—this field indicates the environment(s) in which this notification type is enabled and can include, for example, local environment, development environment, staging environment, or product environment. The purpose of this field is to ensure notifications are not sent to real users in production by mistake if the product platform wishes to test their notifications first.
- Actionable component types and identifier—this field indicates the types of actionable components that are to be included in the notification. It can include multiple actionable component types. Examples of actionable component types include: a component for adding a comment, a component for toggling watch for entities (e.g., spaces, content, issues, etc.), a component for liking an event that is part of the notification (this could allow a user to toggle the state), a component for reacting to an event that is part of the notification, or a generic button component for other use cases such as approving an event, marking an event as resolved, assigning an issue/ticket, approving a pull request, re-running a build, etc.

- Display text for the actionable component—this field is used when the generic button component is used to specify a text template to the displayed on the button. It can include multiple different text templates that can be used for the particular notification type. Examples of display text for the generic button may be "Assign to user A", "Assign to self", "Approve pull request", "User X and User Y have already approved, one more approval needed", "Deploy to production", etc. At the time of requesting the notification or when retrieving latest status of action items, the particular text template that is to be used in that particular instance can be specified from those provided during registration. Accordingly, in some embodiments, each display text template may be associated with a template identifier, which can be used by the various systems to determine which text to display when rendering the notification.
- API endpoint for current status—this field specifies the API endpoint that is to be queried to receive the current status of one or more actions when the dynamic actionable notification is opened/selected at a client device.
- API endpoint for toggling—this field specifies the API endpoint that is to be contacted to push any actions a user has taken with respect to the actionable components in the dynamic notification.
- Fallback text—this field specifies the fallback text to be used in the notification if the device has no connectivity and cannot communicate with any external systems.
- Prescribed actionable component state parameters—this field specifies the possible states of the actionable component that is part of the selected template. The possible states include failed, success, enabled, disabled, and error. In certain embodiments, where an enabled action graphical element can have different display texts associated with it, there can be different enabled states, such as enabled 1, enabled 2, enabled 3, etc., which may be associated with correspondingly different display texts.
- Actionable component preference—this field indicates the priority order of actionable components. If a limited number of actionable components can be displayed in a particular channel or environment, the notification platform uses this information to select the actions to be rendered as part of the notification.

In some embodiments, this registration information is submitted as a YAML file to the notification platform 102 and is referred to as a registration file. It will be appreciated that the notification management module 116 can submit different registrations files for different types of notifications. At the time of sending a notification request, the notification management module 116 can specify which registration file is to be used to generate and forward that specific notification.

FIG. 400 illustrates the steps performed by the product platform 110 (and in particular the notification management module 116) in method 300 in greater detail. At step 402, the notification management module 116 detects an event that requires a dynamic actionable notification to be sent. As used herein, an event may be creation of a new item such as a task, an issue, a request, a source code update, etc. The event may also be, e.g., a change in status of an item, e.g., change in any field of a task or issue, a reminder to complete a task or issue, etc. Similarly, the event may be deletion of an item such as a task, issue, content item, comment, etc. Depending on the type of product platform 110 and the type of computer application hosted by the product platform 110, the type of events detected by the notification management module 116 may change.

However, generally speaking, the types of events that require a dynamic actionable notification to be sent, are predetermined by the notification management module 116. For example, some product platforms 110 my wish to send dynamic actionable notifications each time a user is required to perform an action on any given event whereas other product platforms 110 may wish to notify users when the user is required to perform an action for certain types of events.

In any case, once an event that requires a dynamic actionable notification to be sent is detected, the notification management module 116 determines the notification type required for the detected event (at step 404). In some cases, a product platform 110 may have a single notification type registered with the notification platform 102. In such cases, this step may be omitted. However, in most other cases, product platforms 110 may have defined multiple notification types for different types of events and may have forwarded many different registration files to the notification platform 102. In such cases, the notification management module 116 determines the notification type and more particularly the registration file for the detected event at step 404. In one simple example, the notification management module 116 may maintain a database or lookup table of registration file names registered with the notification platform 102 along with the types of events each of the registration files is suitable for. In this example, the notification management module 116 may perform a lookup in this database/table with the detected event type to identify the corresponding registration file for that event type.

At step 406, the product platform 110 generates a notification request. In some examples, the notification request may be a notification request descriptor which includes:

- Information about the registration file identified at step 404 (e.g., a name of the registration file),
- Information about the event that caused the notification to be generated (e.g., the event type, and an event identifier uniquely identifying the event),
- Information about recipients of the notification (e.g., user identifiers),
- Information about the sender (if a particular user),
- Information about the action items in the notification. That is, the actions to be provided as part of the notification (e.g., identifiers of one or more action types and display texts provided as part of the registration file and/or their current status)
- API endpoints (e.g., for requesting latest action status and/or posting any actions performed by a user back on the product platform 110).

It will be appreciated that it is not necessary for a notification request descriptor to include all of this information. It may include more or fewer fields depending on the template used in the identified registration file. However, the information that is essential for the selected template, and is not supplied as part of the registration file, needs to be provided in the notification request descriptor.

At step 408, the notification request descriptor for the detected event is forwarded to the notification platform 102. In certain embodiments, the notification platform 102 polls the product platform 110 at regular intervals (e.g., every 10 minutes) to determine whether any notification requests have been generated in that interval. In other embodiments, the notification management module 116 automatically forwards the generated notification request to the notification platform 102 as soon as it is created. In one example, the notification management module 116 communicates the notification request via a webhook—i.e., an HTTP POST callback that creates and passes the notification request to a URI of the notification platform 102 when it is generated.

Process at Notification Platform

Figure 5:
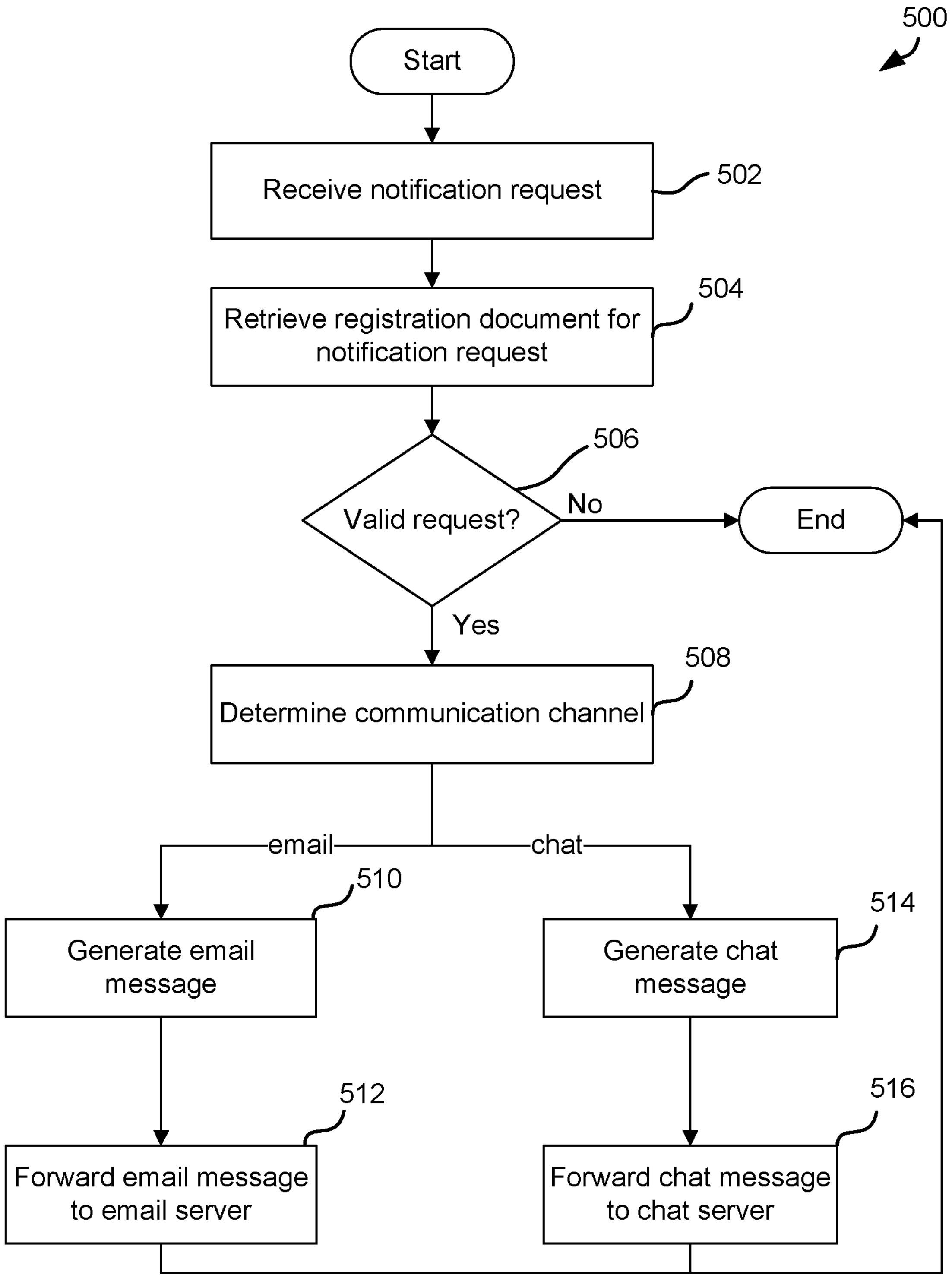
FIG. 5 is a flowchart illustrating an example method for generating and forwarding a notification message at a notification platform according to some embodiments of the present disclosure.

As described previously, the notification platform 102 is configured to receive notification requests, generate dynamic actionable notification messages, and forward these to one or more communication servers 130 for forwarding to client devices 120. FIG. 5 illustrates an example method 500 performed by the notification platform 102 to forward one such notification message to a communication server 130.

The method 500 commences at step 502, where the notification platform 102 receives a notification request. As described previously, the notification request may include a list of intended recipients, an identifier of a registration file corresponding to the notification request, information about the action items in the notification, and information about the requesting party.

At step 504, the notification platform 102 retrieves the registration file corresponding to the notification request. In one example, this may be done by retrieving the identifier of the registration file from the notification request and performing a lookup of the identifier in database 104 to retrieve the corresponding stored registration file.

At step 506, the notification platform 102 determines whether the notification request is valid. For instance, the notification ingestion service 107 may determine whether the entity that created the notification request has permission to create this type of notification request. To do this, the notification ingestion service 107 may compare the identifier of the sender (present in the notification request) with the issuer identifier (found in the registration document). If the two identifiers do not match, the notification ingestion service 107 may determine that the notification request is invalid. At this stage, the notification ingestion service 107 may also determine whether sufficient data is provided as part of the notification request for the type of notification template selected. To this end, the notification ingestion service 107 may identify the selected notification template from the registration file, determine the data fields required in that notification template and determine whether the notification request includes data for each of the required data fields. Data fields may either be essential or optional. If data is not provided for an optional data field, the notification ingestion service 107 may insert a default value. However, if data is not provided for an essential field, the notification ingestion service 107 may determine that the notification is invalid and send an error message back to the notification management module 116. For example, if the notification request descriptor includes an identifier of an action type that does not match any of the action types provided as part of the registration file, the notification ingestion service 107 generates an error message.

If at step 506, the notification platform 102 determines that the notification request is valid, it communicates an acknowledgement/success message back to the notification management module 116 and determines the communication channel that is required to send the notification at step 508. This information is obtained from the registration file. Once the notification platform 102 determines which communication channel is required, e.g., by looking-up the channel identifier in the registration file, the notification platform 102 and in particular the notification log service 108 is configured to generate the notification message.

If at step 508, the notification log service 108 determines that the notification is supposed to be sent as an email message, it generates an email message at step 510. This includes generating a payload for the email message. For instance, the notification platform 102 may retrieve the selected notification template and fill fields of the notification template with the information received as part of the notification request descriptor. For dynamic actionable notifications, the payload for the email message includes the API endpoint for retrieving the latest status of the action (i.e., the status API endpoint), an identifier for the action item(s) associated with the notification, the API endpoint for pushing any actions performed by the user (i.e., the toggle API endpoint), and instructions for rendering graphical elements for the action components in the notification at the client device.

Table A shows some of the fields that are provided as part of the payload.

TABLE A

| Example data fields in dynamic actionable notification payload | |
|---|---|
| Status API Endpoint | https://productplatform.com/actionstatus |
| Toggle API endpoint | https://productplatform.com/actiontoggle |
| Action Item 1 ID | 4023 |
| Action item 2 ID | 4093 |
| Action item 1 display text for enable 1 status | Three approvals required \| Approve |
| Action item 1 display text for enable 2 status | User X has already approved. Two more approval required \| Approve |
| Action item 1 display text for enable 3 status | User X and User Y have already approved. One more approval required \| Approve |
| Action item 1 display text for disable status | Put your feet up. This is already approved and merged |
| Action item 2 display text for all status | Reject |
| Fallback text | "Click here to see the event and approve these amazing instant actions" |

Further, the notification log service 108 retrieves the email addresses of the intended recipients and the sender of the notification. Typically, the product platform 110 provides user identifiers of the recipients of the notifications as part of the notification request. However, these are typically the product platform user identifiers of the intended recipients not the email addresses of the intended recipients. In such cases, the notification platform 102 may maintain or be connected to an identity database that stores user identifiers for all users of an organization for the different product applications and communication applications utilized by the user. The notification log service 108 queries this identity database with the user identifier received as part of the notification request to retrieve the corresponding email addresses of the recipients of the notification.

Once the email message is generated, it is forwarded to the notification distribution service 109 which forwards the email message to the email server 132.

Alternatively, if at step 508, the notification platform 102 determines that the dynamic notification is supposed to be sent as a chat message, it generates a chat message at step 514. This may be a similar process as that followed for the email service, except no email addresses are required.

Instead, the notification log service 108 may identify the chat identifiers for the intended recipients from the identity database.

Once the chat message is generated, it is forwarded to the notification distribution service 109 which forwards the chat message to the chat server 134 for distribution to the intended recipients at step 516.

It will be appreciated that although FIG. 5 illustrates a decision being made to select one notification channel for a communication, this might not always be the case. Instead, in some cases, the dynamic actionable notification may be sent to multiple users via multiple communication channels.

A similar process can be followed to generate mobile notifications. However, in this case, instead of an email address lookup, the notification platform performs a device and product application lookup to identify the correct mobile device to push the notification to.

As seen in FIG. 3, the notification platform's functions end once the dynamic actionable notification is communicated to the communication server(s) 130. Thereafter, the client devices 120 directly communicate with the product platform 110 to retrieve the latest status of actions and push actions.

Process at Client Device

Typically with email messages, new email messages are stored at the email server 132 until the user logs in or accesses the email client 124. Once the email client is opened, the email client requests the email server 132 to release any new messages for the user. Once these new email messages are retrieved they are typically rendered in an 'inbox' of the email client 124 as unread email messages. Similarly, chat messages may be stored on the chat server 134 until a client opens their chat client 124. Once the client is executed, it communicates with the chat server 134 to receive any new chat messages for the user since the time the user last accessed the chat client 124. Once the new chat messages are received, the chat client 124 may display notifications against any channels that have new unseen messages. Once the user selects a channel, the chat messages are rendered in a chat window. Mobile notifications function slightly differently. As soon as the notification is received at the mobile server, it is pushed to the mobile client (unless the mobile client is inactive/dead). Therefore mobile notifications are typically received at mobile devices very quickly. A similar process is followed where the client device is a mobile device and the user has setup real time notifications for email or chat messages on their mobile device. In such cases, the email or chat server communicates the email or chat message to the mobile device as soon as the email or chat message is received at the email or chat server.

Figure 6:
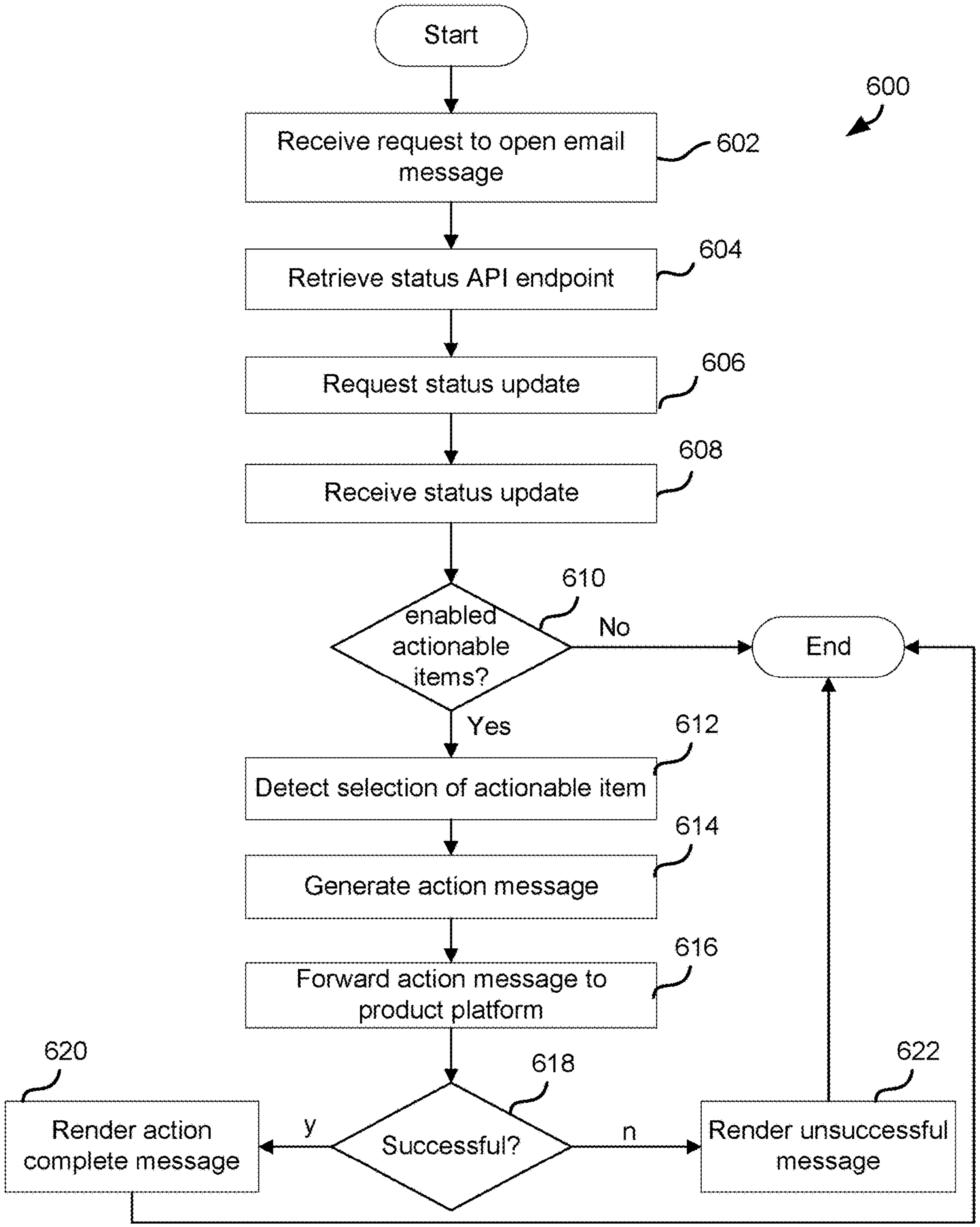
FIG. 6 is a flowchart illustrating an example method for using a dynamic notification at a client device according to some embodiments of the present disclosure.

FIG. 6 illustrates an example method 600 performed by the client device 120 once a dynamic actionable notification is received and viewed by a user. For ease of description it is assumed that the dynamic actionable notification is an email message received at an email client 124. However, it will be appreciated that a similar method is performed, albeit with a few modifications, when the dynamic actionable notification is a chat message or a mobile notification.

Method 600 commences at step 602 where the email client 124 receives a request to open an email message containing a dynamic actionable notification. This request is generated for example when the user selects the email message (including the dynamic actionable notification) displayed in their inbox. Once the email message is selected, the email client retrieves the payload of the email message at step 604. In particular, the email client 124 retrieves the status API endpoint from the payload of the dynamic actionable notification.

At step 606, the email client 124 communicates a request for the latest status of the action items to the Status API endpoint retrieved from the payload. In one embodiment, the email client 124 submits the action identifier(s) of all the action items received as part of the message payload. For instance, using the example shown in Table A, the email client 124 may send a request "GET 4023 4093" to https://productplatform.com/actionstatus. In some cases, the email client 124 also forwards a user identifier of the user logged into the email client 124. This user identifier may be utilized by the product platform 110 to determine whether the user is permitted to view the current status of the event associated with the notification.

At step 608, the email client 124 receives the latest status for the requested action items. At step 610, the email client 124 renders the email message in the client application based on the retrieved latest status of those action items—e.g., whether the actions are to be enabled or disabled. The text for the actionable item is retrieved (from the email payload or from the received current status) and actionable graphical elements are rendered for the enabled actionable items with the retrieved display text. For example, the dynamic actionable notification may be for a pull request that includes two actions-approve or reject, but requires three approvals to merge the pull request changes into the main code. In this example, if no approvals have been received by the time the client 124 requests the latest action status, the product platform may return the following status and display text for the two actions—

| Action ID | Status | Display text | Action text |
|---|---|---|---|
| 4023 | Enable 1 | Three approvals required | Approve |
| 4093 | Enable | — | Reject |

Alternatively, if two users have already approved the pull request by the time the client 124 requests the latest action status, the product platform may return the following status and display text for the two actions—

| Action ID | Status | Display text | Action text |
|---|---|---|---|
| 4023 | Enable 3 | Already approved by John and Jane. One more approval required | Approve |
| 4093 | Enable | — | Reject |

In yet another alternative, if three users have already approved the pull request by the time the client 124 requests the latest action status, the product platform may return the following status and display text for the two actions—

| Action ID | Status | Display text | Action text |
|---|---|---|---|
| 4023 | Disable | Put your feet up. This is already approved and merged | Approve |
| 4093 | Disable | — | Reject |

If all the actionable items are in the disabled state, in one example, the client 124 may not display any graphical elements at all. In another example, the client 124 may display the graphical elements with the text for the actionable items, but in a displayed state. In either example, if the actionable items are disabled, the method 600 ends at this step.

Figure 7:
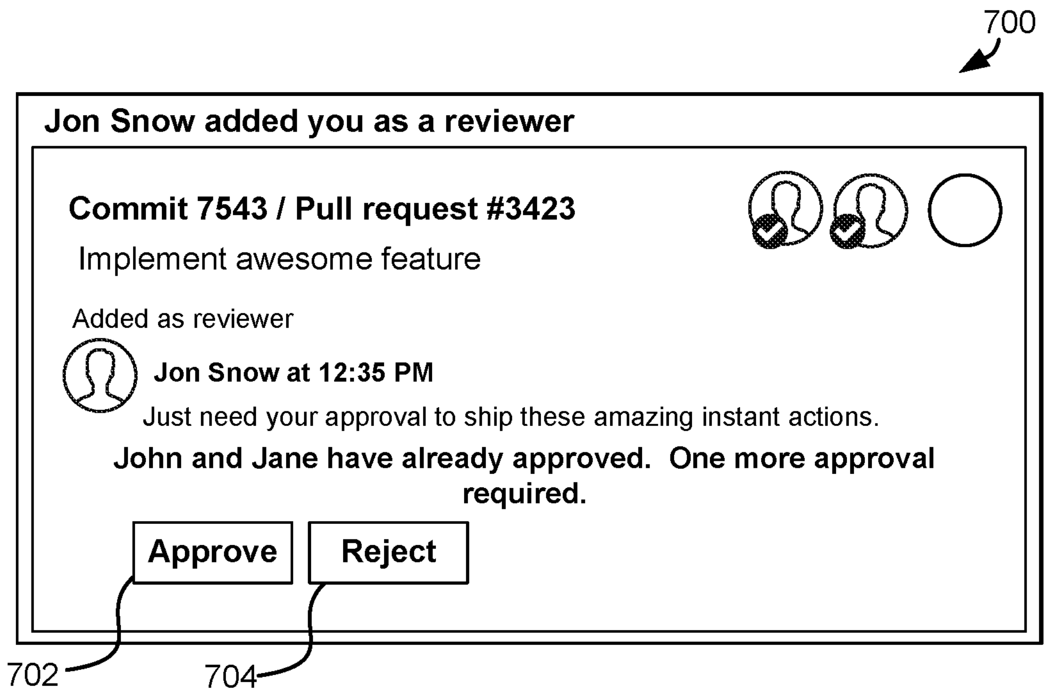
FIG. 7 is a screenshot illustrating an example dynamic actionable notification according to one example.

FIG. 7 illustrates an example dynamic actionable notification 700 for a pull request with two graphical elements 702, 704 for performing any one of two actions-Approve the pull request or reject the pull request. This dynamic actionable notification 700 is displayed once the client 124 retrieves the latest status of the action items from the product platform 110. In this case two other users have already approved the pull request and one more approval is required to complete this action. Accordingly, just above the Approve graphical element, the dynamic actionable notification shows, "Already approved by John and Jane. One more approval required".

Figure 8:
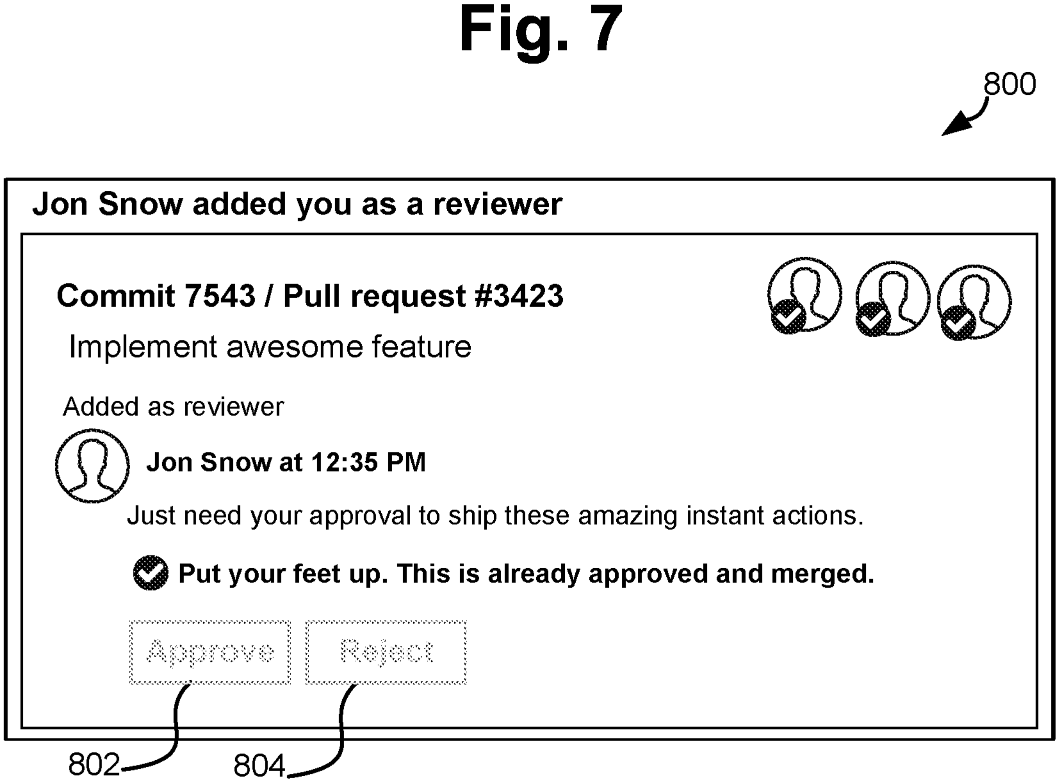
FIG. 8 is a screenshot illustrating an example dynamic actionable notification according to another example.

FIG. 8 illustrates an example dynamic actionable notification 800 for the same pull request as shown in FIG. 7. However, in this example, the pull request had already been approved, so the graphical elements 802, 804 for the two actions are greyed out and disabled and the notification instead includes the text, "Put up your feet. This is already approved and merged".

Returning to FIG. 6, once the notification is displayed with the latest status of the action items, the method proceeds to step 612, where the email client 124 detects selection of a particular actionable graphical element (e.g., 702 or 704 in FIG. 7). In response, the email client 124 identifies the action corresponding to the selected graphical element and generates an action message at step 614. The message includes the action identifier of the action that the user wishes to perform. In some embodiments, this message may also include a user identifier and/or the event identifier of the event for which the action is to be performed. This message is forwarded to the product platform 110 at step 616. In some embodiments, the client 124 may not necessarily need to "generate" the action message. Instead, the action messages may be encoded in the email message payload. For example, selecting button 1 forwards message 1, selecting button 2 forwards message 2, each of which result in different actions at the product platform.

In one example, the client application may forward an HTML POST message (e.g., POST 4023) to the product platform 110 and in particular to the toggle API endpoint (e.g., https://productplatform.com/actiontoggle).

It will be appreciated that sometimes a user may have permission to view a particular notification message (because the user has view permissions for the underlying event), but the user may not have sufficient permission to action that event. Accordingly, before performing the action, the product platform 110 determines whether the user is allowed to perform the action. In a particular embodiment, based on the user identifier provided as part of the POST message, the product platform 110 checks if the user is permitted to perform the action corresponding to the received action identifier.

If the user is permitted to perform the action, the product platform 110 performs the requested action. Once the action has been successfully performed, the product platform 110 updates the state of the actionable item and forwards a message to the notification client 124 with the new state of the actionable item and new text for the actionable item at step 620.

The notification client application 124 in turn updates the corresponding actionable graphical element at step 620 to reflect that the action has been successfully performed. For example, in case the action to perform was to "approve" a pull request, the email client 124 may update the notification to remove the "reject" graphical element and convert the interactive graphical element for "approve" into a non-interactive graphical element that indicates that the pull request has been "approved".

If it is determined that the user does not have permission to perform the action, the product platform 110 can update the state of the actionable item and pass this back to the email client 124. The email client 124 may then update the actionable graphical element to indicate that the user is not permitted to perform the action (e.g., by removing the action buttons).

In some cases, although the user may have permission to perform the action, the action may nonetheless not be successfully performed (e.g., because the action is no longer available, the action has already been performed by another user in the interim, or the product platform timed out). In such cases, the product platform 110 may update the state of the actionable item to 'failure' and forward suitable graphical element text to the notification client 124 to inform the user that the action was not successfully performed. In some cases, the user may be given the option to try again and in other cases the action graphical elements may be removed from the notification. It will be appreciated that these are two possible ways and that other techniques may also be contemplated to inform the user that the action was unsuccessful and these other techniques are within the scope of the present disclosure.

FIG. 6 and the associated method describes that the request for the latest status of the actionable components is transmitted to the product platform 110 when the email notification is opened. In other implementations, the request for the latest status of the actionable components may be transmitted to the product platform 110 when a user "refreshes" display of an email message.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) arc intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for providing dynamic actionable notifications to client devices, the method comprising:

establishing a connection between a notification platform and a client application executing on a client device, the notification platform in communication with an issue tracking system managing a set of issues, each issue having a corresponding set of permissions managed by the issue tracking system;

in response to an event occurring at the issue tracking system with respect to a particular issue managed by the issue tracking system, transmitting a dynamic actionable notification to the client application executing on the client device;

in response to a user interaction with the client application on the client device, causing transmission of current issue data of the particular issue to the client application;

causing display of the notification in the client application, the notification including the current issue data and one or more actionable items associated with the particular issue; and in response to a user selection of a respective actionable item of the one or more actionable items, causing an application programming interface (API) call including a user identifier to be transmitted to the issue tracking system, wherein, in response to receiving the API call and in accordance with a verification that respective permissions of the particular issue permits an action associated with the API call to be performed by a user associated with the user identifier, the issue tracking system implements the action on the particular issue.

2. The computer-implemented method of claim 1, wherein the respective actionable item includes a graphical element that is rendered in accordance with the current issue data.

3. The computer-implemented method of claim 2, wherein in accordance with the current issue data indicating that an action associated with the respective actionable item has been performed, the respective actionable item is rendered as disabled.

4. The computer-implemented method of claim 1, wherein the dynamic actionable notification comprises a status application programming interface (API) endpoint that specifies an endpoint of a remote server to be queried to retrieve the current issue data.

5. The computer-implemented method of claim 1, wherein the dynamic actionable notification comprises a toggle application programming interface (API) endpoint that specifies an endpoint of a remote server to contact to push updated issue data subsequent to a user selection of the respective actionable item.

6. The computer-implemented method of claim 1, wherein the action is an approval or a rejection of a change to the issue.

7. The computer-implemented method of claim 1, wherein the action is performed in response to one or more additional API calls received from one or more additional dynamic actionable notifications transmitted to one or more respective client applications distinct from the client application.

8. A computer-implemented method for providing dynamic actionable notifications to client devices, the method comprising:

in response to an event occurring at an issue tracking system with respect to a particular object managed by the issue tracking system, transmitting a dynamic actionable notification to a client application executing on a client device;

in response to a user interaction with the client application on the client device, causing transmission of current object data of the particular object to the client application;

causing display of the notification in the client application, the notification including one or more actionable items associated with the particular object, the one or more actionable items displayed in accordance with the current object data; and in response to a user selection of a respective actionable item of the one or more actionable items, causing a call, including a user identifier, to be transmitted to the issue tracking system, wherein in response to verifying that permissions associated with the particular object permit an action associated with the call to be performed by a user associated with the user identifier, the action is performed with respect to the particular object.

9. The computer-implemented method of claim 8, wherein the one or more actionable items are enabled or disabled based on the current object data.

10. The computer-implemented method of claim 8, wherein the action is performed in response to one or more additional application programming interface (API) calls received from one or more dynamic actionable notifications transmitted to one or more respective client applications distinct from the client application.

11. The computer-implemented method of claim 8, wherein the dynamic actionable notification comprises a status API endpoint that specifies an endpoint of a remote server to be queried to retrieve the current object data.

12. The computer-implemented method of claim 8, wherein, the dynamic actionable notification includes at least a portion of the current object data.

13. The computer-implemented method of claim 8, wherein:

the object is an issue managed by the issue tracking system; and the action approves a change in status of the issue.

14. A system comprising:

a processor; and non-transitory memory comprising instructions which when executed by the processor cause the system to:

in response to an event occurring at a system with respect to a particular object managed by the system, transmit a dynamic actionable notification to a client application executing on a client device;

in response to a user interaction at the client device, cause transmission of current object data of the particular object to the client application;

cause display of the notification in the client application, the notification including the current object data and one or more actionable items associated with the particular object; and in response to a user selection of a respective actionable item of the one or more actionable items, causing a call to be transmitted to the system, wherein, in response to receiving the call and in accordance with a successful verification that permissions associated with the particular object permit an action associated with the call to be performed by a user associated with the client application, the system implements the action with respect to the particular object.

15. The system of claim 14, wherein the instructions further cause the system to:

in response to the user interaction at the client device, the client device is configured to communicate a request for the current status of the object to a status application programming interface (API) endpoint of a remote server; and the one or more actionable items are displayed in accordance with the current status.

16. The system of claim 14, wherein the one or more actionable items are rendered as enabled or disabled based on the current object data.

17. The system of claim 14, wherein the dynamic actionable notification comprises a status application programming interface (API) endpoint that specifies an endpoint of a remote server to be queried to retrieve the current object data.

18. The system of claim 14, wherein the instructions further cause the system to:

transmit a confirmation message to the client application subsequent to the system implementing the action; and subsequent to receiving the confirmation message, the client application is configured to update a display of the dynamic actionable notification to indicate that the action has been completed.

19. The system of claim 14, wherein:

the system is an issue tracking system;

the object is an issue managed by the issue tracking system; and the action is a pull request for the source code.

20. The system of claim 14, wherein:

the system is a source code management system;

the object is source code managed by the source code management system; and the action is a pull request for the source code.

* * * * *